United States Patent [19]

Winters et al.

[11] 4,066,813

[45] Jan. 3, 1978

[54] METHODS OF REDUCING THE GROWTH OF CELLULOSE-BACKED FLOORING PRODUCTS AND THE RESULTING CELLULOSE-BACKED FLOORING PRODUCTS

[75] Inventors: Donald C. Winters, Whitehouse Station; Laurence F. Haemer, Fairfield; William H. Powell, Livingston, all of N.J.

[73] Assignee: Congoleum Corporation, Kearny, N.J.

[21] Appl. No.: 765,472

[22] Filed: Feb. 4, 1977

[51] Int. Cl.² .............................. B32B 3/14; B32B 3/16
[52] U.S. Cl. ........................................ 426/282; 156/71; 428/47; 428/48; 428/50; 428/284; 428/289; 428/507; 428/511; 428/512; 428/513; 428/514; 428/537; 428/538; 428/539
[58] Field of Search ...................... 428/47, 48, 50, 248, 428/274, 280, 282, 284, 289, 507, 511, 512, 513, 514, 537, 538, 539; 156/71, 297, 299, 300, 306

[56] References Cited

U.S. PATENT DOCUMENTS 2,165,788  7/1939  Elmendorf ........................ 428/50

Primary Examiner—Marion E. McCamish
Attorney, Agent, or Firm—Richard T. Laughlin

[57] ABSTRACT

A method of inhibiting or reducing the undesirable growth properties of a resilient flooring product having a fibrous cellulosic backing which comprises: substantially uniformly incorporating in the fibrous cellulosic backing of a resilient flooring product from about 0.05% by weight to about 4% by weight, based on the weight of the fibrous cellulosic backing, of a growth inhibitor from the group consisting of alums, aluminum sulfate, and mixtures thereof; and installing the resilient flooring product on a surface coated with a water-based adhesive while the fibrous cellulosic backing contains such percentages of the growth inhibitor, whereby undesirable growth, swelling, buckling or the appearance of bubbles in the resilient flooring product is inhibited or reduced, even when the installation takes place at low relative humidity conditions below about 50% relative humidity. The resulting cellulose-backed resilient flooring products having reduced growth properties are also included in the scope of the inventive concept.

21 Claims, 1 Drawing Figure

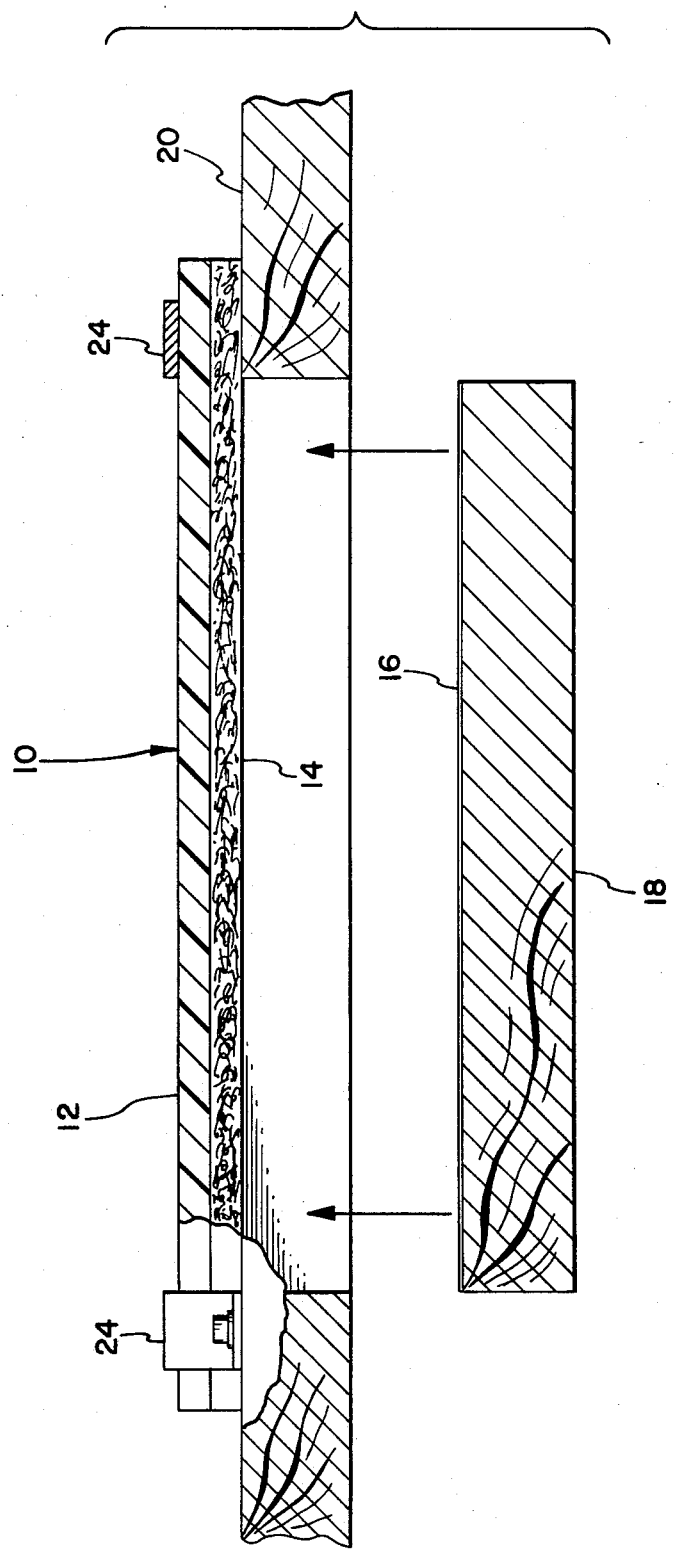

METHODS OF REDUCING THE GROWTH OF CELLULOSE-BACKED FLOORING PRODUCTS AND THE RESULTING CELLULOSE-BACKED FLOORING PRODUCTS

THE BACKGROUND OF THE INVENTIVE CONCEPT

Sheets of resinous compositions have found widespread use as decorative and wear-resistant coverings for a wide variety of products. Possibly the largest use for such resinous sheet materials is in the resilient floor covering area wherein such resinous sheet materials are applied and adhered to floors or other like surfaces. In many instances, the resinous sheet materials are applied to or are formed on backing sheet materials of a fibrous, felted, matted, or nonwoven construction comprising cellulosic fibers, such as cotton or rayon, for example, in which may be incorporated relatively minor amounts, less than about 50% by weight, and preferably less than about 20% by weight of synthetic or man-made fibers of polyesters, polyamides, polyolefins, polyacrylics, modacrylics, etc. Such backing materials have very many purposes, the most common being that of increasing the strength, wear-life, and serviceability properties and characteristics of the resilient floor covering product.

Some of these resilient floor covering products are laid or installed in lengths of over 25 feet, or over 100 feet, or even more, in mobile homes, trailers, public buildings such as hospitals, libraries, museums, and the like and are usually adhered to the floor, or sub-flooring or other surface, by means of adhesives. Occasionally, when such a resilient covering is being adhered to a surface of great length by means of a water-based adhesive, it is noted that the resilient floor covering tends to "creep" or to "grow" immediately after being installed whereby swelling, buckling, or the appearance of bubbles or ridges takes place in the resilient floor covering. Such very undesirable tendency to grow is usually not noticed in installations of relatively short or moderate lengths. However, in installations of relatively great length, this undesirable growth in the resilient flooring product can become a very serious problem. Such undesirable growth is not limited to the length dimension or long direction of the resilient floor coverings. As a matter of fact, such undesirable growth is noted often in the width dimension or short direction which, although only 6 feet to 15 feet, exhibits relatively greater percentages of undesirable growth than the long or machine direction. It has also been observed that such undesirable tendency to grow is increased when the installation of the resilient floor covering takes place at relatively low percentages of relative humidity, say, below about 50%. In view of the fact that many installations of floorings frequently are carried out at relative humidities of from about 10% to about 50%, the undesirable growth properties must be carefully kept in mind and reduced or inhibited.

PURPOSES AND OBJECTS OF THE INVENTIVE CONCEPT

It is therefore a principal purpose and object of the present inventive concept to provide an improved resilient flooring product which can be laid or installed in very great lengths and adhered to the floor or other surface by means of water-based adhesives under conditions of relative humidity of less than about 50%, and particularly between about 10% to about 50% relative humidity, without undesirable growth, swelling, buckling or the appearance of bubbles or ridges in the resilient floor covering.

BRIEF SUMMARY OF THE INVENTIVE CONCEPT

It has been found that such principal purposes and objects of the present inventive concept, as well as other principal purposes and objects which will become clear from a further reading and understanding of this disclosure, may be achieved by providing a method of inhibiting or reducing the undesirable growth properties of a resilient floor covering having a fibrous cellulosic backing which comprises substantially uniformly incorporating in the fibrous cellulosic backing from about 0.05% by weight to about 4% by weight, based on the weight of the fibrous cellulosic backing, of a growth inhibitor from the group consisting of alums, aluminum sulfate, and mixtures thereof; and installing the resilient floor covering on a surface treated or coated with a water-based adhesive while the fibrous cellulosic backing contains such percentages of the growth inhibitor, whereby undesirable growth, swelling, buckling, or the appearance of bubbles or ridges in the resilient flooring product is inhibited or reduced, even when the installation takes place at relatively low relative humidity conditions below about 50%, such as between about 10% and about 50% relative humidity.

BRIEF DESCRIPTION OF THE DRAWINGS

In the following specification and accompanying self-explanatory drawings, there are described and illustrated preferred and typical embodiments of the present inventive concept, but it is to be understood that the invention, in its broader aspects, is not to be deemed limited to such preferred and typical embodiments as disclosed, except as determined by the scope and spirit of the appended claims.

Referring to the accompanying self-explanatory drawings,

The FIGURE is a schematic, fragmentary, partially-exploded, cross-sectional elevational view of a portion of a typical resilient flooring product in a portion of test apparatus designed to determine the undesirable growth properties of the typical resilient flooring product when coming into direct, intimate contact with a wood or other substance or substrate treated or coated with a water-based adhesive.

DESCRIPTION OF PREFERRED OR TYPICAL EMBODIMENTS

In the FIGURE in the drawings, there is shown a portion of a resilient floor covering 10 comprising an upper layer of a resinous composition 12 and a fibrous cellulosic backing layer 14 containing a growth inhibitor to be described in greater detail hereinafter. As shown, the resinous composition layer 12 is adhered to the fibrous cellulosic backing layer 14. Also shown is a portion of wood flooring 18 which is similar or equivalent to that usually employed as a base upon which the resilient floor covering 10 is adhered by means of a water-based adhesive 16.

THE RESINOUS COMPOSITION

A standard or conventional resinous composition 12, preferably a fluid or semi-fluid plastisol composition, rather than a organosol or an aqueous latex, is substantially uniformly applied to or deposited upon the surface of the fibrous cellulosic backing material 14 in a relatively thin, substantially uniformly thick layer. The thickness of the layer or plastisol composition 12, as applied and still wet or fluid, is in the range of from about 0.0003 inch to about 0.030 inch or more, if so desired or required by the nature of the intended use of the resilient floor covering 10.

The specific nature and the chemical and physical characteristics and properties of the particular plastisol composition 12 do not relate to the essence of the present inventive concept but, preferably, it is thermoplastic polymer or homopolymer of polyvinyl chloride, or a copolymer, block polymer, or graft polymer of polyvinyl chloride and one or more other co-polymerizable resins such as vinyl acetate, vinyl propionate, vinyl butyrate, vinylidene chloride, alkyl methacrylates and acrylates, etc. Other thermoplastic resins, such as polyurethanes, polyamides, polyesters, polyolefins, polystyrenes, polycarbonates, acrylics, etc., are also of applicability within the broader aspects of the present inventive concept. The plastisol composition may also contain a blowing or forming agent, such as described in U.S. Pat. Nos. 3,293,094 and 3,293,108, which issued Dec. 20, 1966, as well as other additives such as catalysts, stabilizers, pigments, dyes, anti-foam agents, viscosity modifiers, etc. Typical formulations and compositions are to be found in the above-cited patents.

THE CELLULOSIC BACKING

The fibrous cellulosic backing material 14 as a matted, felted nonwoven, or the like fibrous sheet predominantly comprising cellulosic fibers in an amount ranging from at least about 50% by weight to 100% by weight, and preferably from about 80% by weight to 100% by weight, of the fibrous sheet. The cellulosic fibers may be derived from rayon especially the regenerated cellulose or cuprammonium types, or from cotton or other vegetable fibers, such as flax, hemp, abaca, jute, straw, ramie, sisal, istle, china grass, cotton grass, agave, pita, esparto, evergreen or coniferous wood fibers, deciduous or broad-leaf hardwood fibers, etc. Such fibers are used in various lengths, as short as ⅛ inch, or even less, or as long as about ½ inch, or more, and in various forms and shapes such as comminuted or macerated fibers, cotton linters, finely chopped rags or cloths, waste, wood pulp and wood fibers such as used in the paper-making art, etc. Such fibrous materials are formed into matted, felted, or non-woven sheets by conventional papermaking or related machines and have thicknesses in the range of from about 0.015 to about 0.150 inch, or even greater, if so desired or required by the existing circumstances. These felted sheets are preferably also saturated with latex and reactive saturation by beater addition or saturation technique or by wet end addition from 15% to 40% based on the dry weight of fiber furnish.

Up to 50% by weight of such fibrous materials may be synthetic or manmade fibers, such as polyesters, polyamides 6/6 and 6, polyacrylics, modacrylics, polyolefinic fibers, polyethylene and polypropylene, etc.

PREPARATION OF FLOORING PRODUCTS

After the plastisol composition has been applied to the fibrous backing sheet 14, it is heated in an oven or other heating apparatus and the plastisol composition is gelled and firmed in a conventional processing operation. Such gelled and firmed product is subsequently printed with a printing ink composition of a standard or conventional formulation or composition which may also include blowing or foaming modifiers. A wear layer or top coat (not shown) may then be applied, if desired or required, and the produuct is then blown or foamed, if a blowing agent was included in the plastisol composition. These and other processing steps are standard or conventional and are described in detail in the herein mentioned United States Patents and do not relate to the essence of the present inventive concept.

THE GROWTH INHIBITOR

A growth inhibitor is included substantially uniformly in the fibrous cellulosic backing material 14 in order to reduce the undesirable growth characteristics of the resinous flooring materials which are backed with the fibrous cellulosic backing materials.

Such growth inhibitors include, for example: aluminum sulfate, $Al_2(SO_4)_3 \cdot 18 H_2O$; or any one or more of the various alums which are hydrated double sulfate salts of monovalent metals, such as potassium, sodium, and ammonium, and trivalent metals, such as aluminum, iron, and chromium. A few typical and preferred examples of such alums are: potash alum, $K_2SO_4 \cdot Al_2(SO_4)_3 \cdot 24 H_2O$; ammonium alum, $(NH_4)_2SO_4 \cdot Al_2(SO)_3 \cdot 24 H_2O$; and sodium alum, $Na_2SO_4 \cdot Al_2(SO_4)_3 \cdot 24 H_2O$.

These growth inhibitors are incorporated substantially uniform in the fibrous cellulosic backing material 14 usually in amounts of aqueous solutions having concentrations of from about 1% by weight to about 20% by weight, whereby the dry add-on of the growth inhibitor itself is in the range of from about 0.05% by weight to about 4% by weight, and preferably from about 0.1% by weight to about 1% by weight, based on the weight of the fibrous cellulosic backing material. Such growth inhibitors may be incorporated in the fibrous cellulosic backing material by any known standard or conventional coating or impregnating procedure, such as brushing or spraying or padding, by contact with a roller (bare, fabric-covered, or sponge-covered), or a brush, etc., partially immersed in a trough, or the like, etc.

THE WATER-BASED ADHESIVE

The adhesive 16 which is used to adhere the resilient floor covering 10 to the wood floor or other surface is a water-based adhesive 16 which is selected from a large, well-known group of such commercially available adhesives. Examples of such water-based adhesives are: linoleum paste, an aqueous lignin liquor with included clay; various acrylic and styrene-butadiene aqueous latices; butadiene-acrylonitrile latices; polybutadiene latices; water dispersions of modified vinyl chloride polymers, ester plasticized; carboxylated styrene-butadiend latices; etc. Such water-based adhesives may or may not contain fillers, antioxidants, fungicides, foam depressants, etc.

THE TEST PROCEDURES

The test procedures for determining the extent of the effect of the various chemical agents on the undesirable growth properties and the characteristics of resilient floor coverings, when installed over and in direct, intimate contact with water-based adhesives at relatively low relative humidity conditions below about 50% relative humidity, and especially in the range of from about 10% to about 50% relative humidity, are as follows:

A ⅜ inch thick, relatively flat, smooth piece of particle board, or typical construction plywood 20, such as is used for sub-flooring in homes and buildings, is the sample test base. A narrow, rectangular opening measuring 2 inches wide by 12 inches long is very carefully cut from the central portion of the sample test base plywood 20 and the 2 inch by 12 inch piece 18 cut of the plywood 20 is carefully retained and reserved for future use in the testing of the samples of resilient flooring materials and the different chemicals.

A test sample piece of the resilient floor covering 10 to be tested is cut out of a larger piece of such material and measures 2 inches wide by 15 inches long. This cut-out test sample piece is stored in a temperature and humidity controlled room at 75° F. and 30% relative humidity for a period of seven days. Equilbrium conditions are substantially reached at 30% relative humidity and 75° F. by the end of that period of time. The particular growth inhibitor is included in the fibrous cellulosic backing material prior to the storage in the temperature-humidity controlled room and the test sample is ready for the test procedures. There is a separate test sample for each growth inhibitor.

The test sample piece of resilient floor covering 10 is then carefully placed over the 2 inch by 12 inch opening in the plywood base, with the cellulosic backing material 14 directly facing the opening, as shown in the Figure. The long sides of the cut-out opening in the plywood base correspond exactly with the long sides of the test sample piece, but approximately 1½ inches of the test sample piece extend beyond the end edges of the opening in the plywood base 20. The test sample piece is then clamped in position by clamps 24, 24 with the unconfined space between the inner edges of the clamps 24, 24 measuring 12 inches exactly. This is essentially the position of the FIGURE of the drawings.

The 2 inch by 12 inch cut-out piece is then coated with a water-based adhesive 16 in approximately the same amounts which are applied to a surface prior to installation and then the cut-out piece 18 is replaced in the cut-out opening against the fibrous cellulosic backing materials 14 in direct, intimate contact with the fibers thereof with approximately the same pressure and force as that normally exerted during a typical installation. Such action accurately simulates the installation of a resilient floor covering 10 on a sub-flooring of wood 18 which has been coated with a water-based adhesive 16.

The resinous composition layer 12 (the top side in the FIGURE) is carefully observed for any signs of growth, swelling, buckling, or the appearance of bubbles or ridges. Readings are taken at intervals of 3 minutes, 6 minutes, 9 minutes, 12 minutes and 15 minutes. Any buckling or bubbles are measured in units of 1/32 inch. A reading of 3 indicates a buckle or a bubble of about 3/32 inch height. A reading of 0 indicates no buckling or bubbling, and an acceptable result.

EXAMPLE I

The resinous composition is primarily polyvinyl chloride, such as noted in the formulation of Example 1 in U.S. Pat. No. 3,293,094. The fibrous cellulosic backing material is a 0.025 inch thick cellulose cotton felt. The water-based adhesive is linoleum paste, an aqueous lignin liquor with included clay. All fibrous cellulosic backing materials are brought to a moisturization content of approximately 6% by weight by addition of the indicated growth inhibitor treating agent. The 6% is based on the weight of the fibrous cellulosic backing. The control samples have no added treating agents or added moisturization. The results are set forth in the attached Table.

TABLE

| Treating Agent | Exposure Time in Minutes | | | | |
|---|---|---|---|---|---|
|  | 3 | 6 | 9 | 12 | 15 |
| Water | 0 | 4 | 6 | 6 | 7 |
| Water | 0 | 4 | 6 | 6 | 6 |
| 10% glycerine | 0 | 2½ | 2½ | 2 | 2 |
| 5% glycerine | 0 | 3 | 4 | 4 | 4 |
| 2% glycerine | 2½ | 4 | 6 | 7 | 7 |
| 10% ethylene glycol | 0 | 0 | 0 | 0 | 0 |
| 5% ethylene glycol | ½ | 4½ | 5½ | 6 | 6 |
| 2% ethylene glycol | 4 | 7 | 8 | 8 | 8 |
| 10% potassium acetate | 0 | 0 | 0 | 0 | 0 |
| 5% potassium acetate | 0 | 0 | 0 | 1½ | 1½ |
| 2% potassium acetate | 0 | 5 | 7 | 8 | 8 |
| 10% aluminum sulfate | 0 | 0 | 0 | 0 | 0 |
| 5% aluminum sulfate | 0 | 0 | 0 | 0 | 0 |
| 2% aluminum sulfate | 0 | 0 | 0 | 0 | 0 |
| Control | 0 | 3 | 5 | 6 | 6 |
| Control | 0 | 6 | 8 | 8 | 8 |

These are the growth determinations (ridge heighths) in a one-foot length of the sample.

The three test samples in which 2%, 5%, and 10% of aluminum sulfate are incorporated substantially uniformly in the fibrous cellulosic cotton felt backing as a test growth inhibitor are found to be very successful and commercially acceptable at all levels for all three concentrations and for all the time periods observed.

EXAMPLE II

The test procedures described in Example I are followed substantially as set forth therein with the exception that the fibrous cellulosic backing material contains about 10% by weight of polyester fibers and about 90% by weight of cotton fibers. The results are generally comparable to the results which are obtained in Example I.

EXAMPLE III

The test procedures described in Example I are followed substantially as set forth therein with the exception that the fibrous cellulosic backing material contains about 25% by weight of polyester fibers and about 75% by weight of cotton fibers. The results are generally comparable to the results obtained in Example I.

EXAMPLE IV

The test procedures described in Example I are followed substantially as set forth therein with the exception that the fibrous cellulosic backing material comprises cotton linters. The results are generally comparable to the results obtained in Example I.

EXAMPLE V

The test procedures described in Example I are followed substantially as set forth therein with the exception that the resilient floor covering material is brought to an equilibrium at 75° F. but at a relative humidity of 50%, rather than 30%. The results are generally improved for the chemicals other than aluminum sulfate but still are not completely satisfactory. Thus, it would appear that the undesirable growth properties are less acute at 50% relative humidity than at 30% relative humidity. Aluminum sulfate is still the only chemical which is investigated and shows acceptable results at all levels for all time periods.

EXAMPLE VI

The test procedures described in Example I are followed substantially as set forth therein with the exception that the linoleum paste is replaced by a water-based acrylic latex. The results obtained in this Example are generally comparable to the results obtained in Example I.

EXAMPLE VII

The test procedures described in Example I are followed substantially as set forth therein with the exception that the aluminum sulfate is replaced by a 50%:50% by weight mixture of aluminum sulfate and potash alum. The results obtained are generally comparable to the results obtained in Example I.

EXAMPLE VIII

The test procedures described in Example I are followed substantially as set forth therein with the exception that the aluminum sulfate is replaced by a 50%:50% by weight mixture of aluminum sulfate and ammonium alum. The results obtained are generally comparable to the results obtained in Example I.

Although specific examples of the inventive concept have been described in particularity, the same should not be construed as limiting the scope of the invention. It is understood that any suitable changes, modifications, and variations may be made without departing from the spirit and scope of the invention, keeping within the spirit and scope of the appended claims.

What is claimed is:

1. A method of inhibiting or reducing the undesirable growth of a resilient flooring product having a fibrous cellulosic backing which comprises: incorporating substantially uniformly in the fibrous cellulosic backing of a resilient flooring product from about 0.05% by weight to about 4% by weight, based on the weight of said fibrous cellulosic backing, of a growth inhibitor from the group consisting of alums, aluminum sulfate, and mixtures thereof; and installing said resilient flooring product on a surface coated with a waterbased adhesive while said resilient flooring product contains said percentages of said growth inhibitor, whereby undesirable growth, swelling, buckling, or the appearance of bubbles in said resilient flooring product is inhibited or reduced.

2. A method as defined in claim 1, wherein said growth inhibitor is included in said fibrous cellulosic backing in an amount ranging from about 0.1% by weight to about 1% by weight of said fibrous cellulosic backing.

3. A method as defined in claim 1, wherein said resilient flooring product is installed under relative humidity conditions of less than about 50% relative humidity.

4. A method as defined in claim 1, wherein said resilient flooring product is installed under relative humidity conditions of less than about 50% relative humidity and down to 10% relative humidity.

5. A resilient flooring product having reduced undesirable growth properties comprising: a resinous composition layer; and a fibrous cellulosic backing adhered to said resinous composition layer, said fibrous cellulosic backing comprising predominantly cellulosic fibers and substantially uniformly containing from about 0.05% by weight to about 4% by weight, based on the weight of said fibrous cellulosic backing, of a growth inhibitor from the group consisting of alums, aluminum sulfate, and mixtures thereof.

6. A resilient flooring product as defined in claim 5, wherein said fibrous cellulosic backing contains from about 0.1% by weight to about 1% by weight, based on the weight of said fibrous cellulosic backing.

7. A resilient flooring product as defined in claim 5, wherein said fibrous cellulosic backing comprises cotton fibers predominantly.

8. A resilient flooring product as defined in claim 5, wherein said fibrous cellulosic backing comprises rayon fibers predominantly.

9. A resilient flooring product as defined in claim 5, wherein said fibrous cellulosic backing comprises vegetable fibers predominantly.

10. A resilient flooring product as defined in claim 5, wherein said growth inhibitor is aluminum sulfate.

11. A resilient flooring product as defined in claim 5, wherein said growth inhibitor is potassium aluminum sulfate.

12. A resilient flooring product as defined in claim 5, wherein said growth inhibitor is ammonium sulfate.

13. A resilient flooring product as defined in claim 5, wherein said growth inhibitor is sodium aluminum sulfate.

14. A resilient flooring product as defined in claim 5, wherein said growth inhibitor is an alum.

15. A resilient flooring product as defined in claim 5, wherein said fibrous cellulosic backing comprises a minority of less than about 50% by weight of synthetic or man-made fibers.

16. A resilient flooring product as defined in claim 15, wherein said synthetic or man-made fibers are polyester fibers.

17. A resilient flooring product as defined in claim 15, wherein said synthetic or man-made fibers are polyolefinic fibers.

18. A resilient flooring product as defined in claim 15, wherein said synthetic or man-made fibers are polyamide fibers.

19. A resilient flooring product as defined in claim 15, wherein said synthetic or man-made fibers are polyacrylic fibers.

20. A resilient flooring product as defined in claim 15, wherein said synthetic or man-made fibers are modacrylic fibers.

21. A resilient flooring product as defined in claim 5, wherein said fibrous cellulosic backing comprises less than about 20% by weight of synthetic or man-made fibers.

* * * * *